(12) United States Patent
Dames et al.

(10) Patent No.: US 9,346,497 B2
(45) Date of Patent: May 24, 2016

(54) VARIABLE TREAD WIDTH VEHICLE

(71) Applicants: Matthew W. Dames, Clarion, IA (US); James A. Schaffer, Clarion, IA (US)

(72) Inventors: Matthew W. Dames, Clarion, IA (US); James A. Schaffer, Clarion, IA (US)

(73) Assignee: Hagie Manufacturing Company, Clarion, IA (US)

( * ) Notice: Subject to any disclaimer, the term of this patent is extended or adjusted under 35 U.S.C. 154(b) by 39 days.

(21) Appl. No.: 14/248,728

(22) Filed: Apr. 9, 2014

(65) Prior Publication Data

US 2015/0291233 A1 Oct. 15, 2015

(51) Int. Cl.
*B62D 49/06* (2006.01)
*B60G 7/00* (2006.01)
*B60B 35/10* (2006.01)
*B60G 3/20* (2006.01)

(52) U.S. Cl.
CPC .......... *B62D 49/0678* (2013.01); *B60B 35/109* (2013.01); *B60B 35/1027* (2013.01); *B60B 35/1054* (2013.01); *B60G 3/20* (2013.01); *B60G 7/001* (2013.01); *B60G 7/006* (2013.01); *B60G 2300/08* (2013.01); *B60G 2300/40* (2013.01); *B60G 2500/30* (2013.01)

(58) Field of Classification Search
CPC .. B62D 49/0678; B62D 21/14; B62D 63/061; Y10S 56/10; B60G 2300/40; B60G 2200/132; B60B 35/1036–35/109
USPC .......................................................... 301/128
See application file for complete search history.

(56) References Cited

U.S. PATENT DOCUMENTS

| | | | | |
|---|---|---|---|---|
| 3,063,510 A | * | 11/1962 | Hunger et al. | 180/9.1 |
| 3,969,034 A | * | 7/1976 | Gaul | B60B 27/0026 301/1 |
| 4,621,872 A | * | 11/1986 | Yotsumoto | B60B 35/001 180/906 |
| 4,986,386 A | * | 1/1991 | Iwamoto | B60B 35/001 180/209 |
| 5,121,808 A | * | 6/1992 | Visentini | B60B 35/003 180/435 |
| 5,282,644 A | * | 2/1994 | Larson | 280/638 |
| 5,326,128 A | * | 7/1994 | Cromley, Jr. | 280/656 |
| 5,515,934 A | * | 5/1996 | Davis | 180/8.2 |
| 6,145,610 A | * | 11/2000 | Gallignani | 180/9.48 |
| 6,206,125 B1 | * | 3/2001 | Weddle | B60B 35/001 180/209 |
| 7,163,227 B1 | * | 1/2007 | Burns | 280/638 |
| 7,845,443 B2 | * | 12/2010 | Liberty et al. | 180/24.07 |
| 8,042,817 B2 | * | 10/2011 | Motebennur et al. | 280/5.514 |
| 8,205,892 B2 | * | 6/2012 | Mackin | B60B 35/1054 180/209 |
| 8,398,179 B2 | * | 3/2013 | Mackin | A01D 41/12 180/209 |
| 2004/0163869 A1 | * | 8/2004 | Chun et al. | 180/209 |
| 2011/0248476 A1 | * | 10/2011 | Ericsson | B60B 35/1054 280/638 |

OTHER PUBLICATIONS

Author Unknown. 'Custom Built Lifted Rogator'. [online], [retrieved on Jun. 11, 2015]. Retrieved from the Internet <URL: https://www.youtube.com/watch2v=IAGOkMgo514>.

(Continued)

*Primary Examiner* — Katy M Ebner
*Assistant Examiner* — Emma K Frick
(74) *Attorney, Agent, or Firm* — Brett J. Trout

(57) ABSTRACT

A system and method for varying the tread width of a vehicle. The system includes extensible shafts coupled to the wheels of the vehicle. Eccentric cylinders rotate out of frictional locking engagement with the extensible shafts to allow the extensible shafts to be extended or refracted to adjust the tread width of the vehicle. The eccentric cylinders rotate into frictional locking engagement with the extensible shafts to reduce undesired travel of the extensible shafts during vehicle operation.

19 Claims, 12 Drawing Sheets

(56) References Cited

OTHER PUBLICATIONS

Author Unknown. 'RCM Harvester'. [online], [retrieved on Jun. 11, 2015]. Retrieved from the Internet <URL: http://www.voltake.fi/rcm-harvester>.

Author Unknown. 'Condor MountainMasterPlus'. [online], [retreived on Jun. 11, 2015]. Retrieved from the Internet <URL: http://www.agrifac.com/condor/condor-mountainmasterplus>.

Author Unknown. 'Condor ClearancePlus'. [online], [retreived on Jun. 11, 2015]. Retrieved from the Internet <URL: http://www.agrifac.com/condor/condor-clearanceplus>.

Author Unknown. 'Rogator 600B Number One Choice'. [online], Grubbenvorst, Netherlands [retreived on Jun. 11, 2015]. Retrieved from the Internet <URL: http://www.challenger-ag.com/EMEA/GB/products/applicators/215.htm>.

Dammann, Herbert. 'Dammann-trac DT 2000 H S4 Highlander'. [online], [Hedendorf Germany] [retrieved on Jun. 11, 2015]. Retrieved from the Internet <URL: http://www.dammann-technik.de/html/Produkte/highlander.aspx>.

Leonard, Winston. 'Gryphin—The day after tomorrow . . . '. [online], [Asheville (NC): Mar. 3, 2007, [retrieved on Jun. 11, 2015]. Retrieved from the Internet <URL: http://www.volvoce.com/CONSTRUCTIONEQUIPMENT/ASIA/EN-SG/PRODUCTS/INNOVATIONS/CONCEPT_WHEEL_LOADER/Pages/introduction.aspx>.

Valtanen, Jarkko. 'Rakkatec RCM Harver', [online], [retrieved on Jun. 12, 2015]. Retrieved from the Internet <URL: http://www.rakkatec.fi/rakkatec-3.html>.

\* cited by examiner

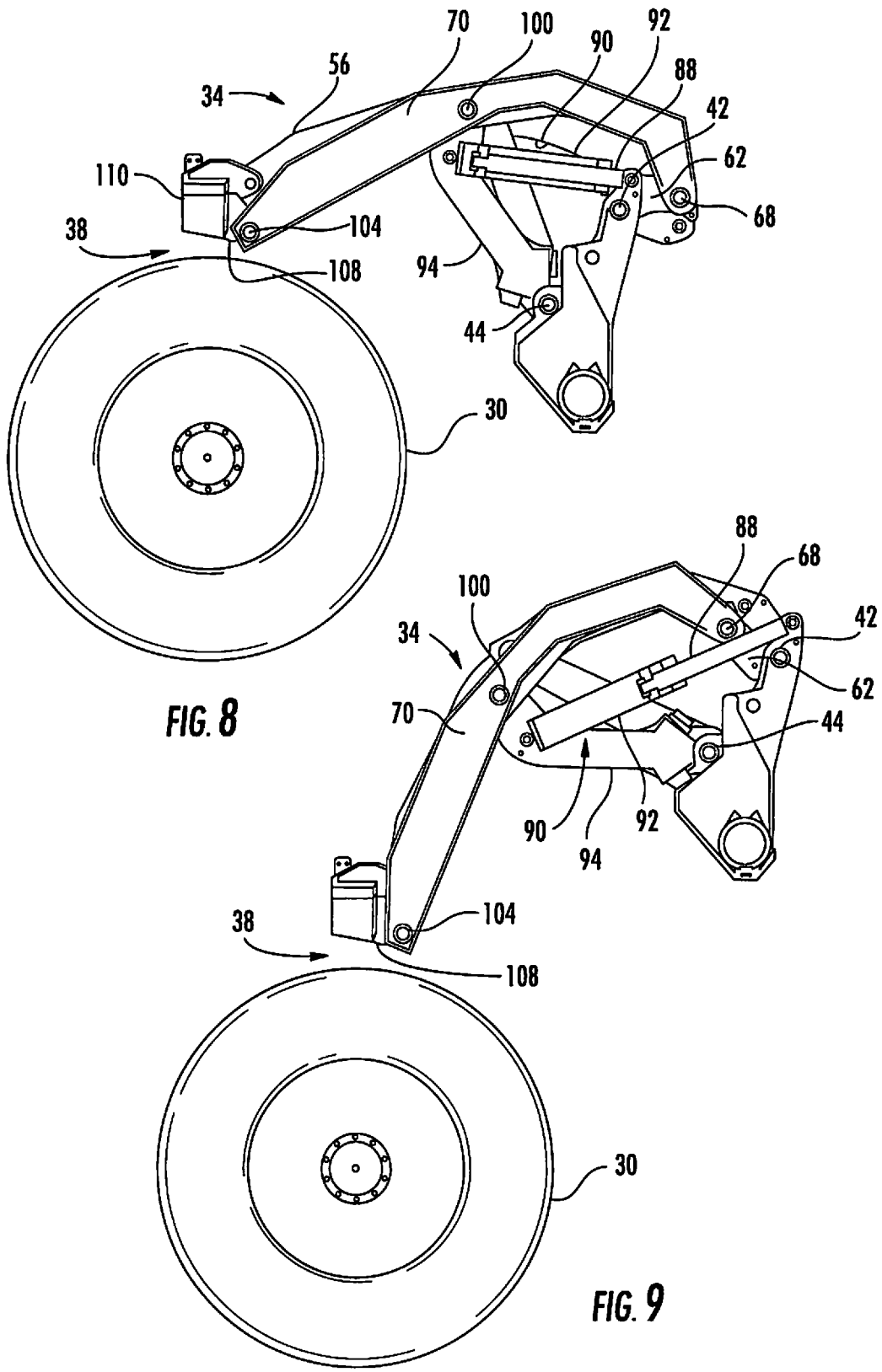

VARIABLE TREAD WIDTH VEHICLE

FIELD OF THE INVENTION

The disclosed embodiments relate in general to a variable tread width vehicle and, more specifically, to a dynamically variable tread width vehicle with a secure tread width locking system.

BACKGROUND OF THE INVENTION

Variable tread width vehicles are known in the art. U.S. Pat. No. 2,901,050 teaches a vehicle with laterally extensible wheel assemblies. The wheel assemblies of such vehicles are provided with sleeves that ride back and forth along shafts. The wheel assemblies may be extended or retracted by various mechanisms, such as bell cranks or hydraulic cylinders.

It is especially desirable to use variable width tread vehicles in agriculture to allow the vehicles to navigate through agricultural fields with varying wheel spacing and widths. One drawback associated with such prior art vehicles is the inability to securely lock the wheel assemblies against undesired lateral movement once the wheel assemblies are extended or retracted to their desired position. Bell crank linkages and hydraulic cylinders, such as those described in U.S. Pat. No. 2,901,050, have an inherent amount of play that allows the wheel assemblies to move back and forth laterally as the vehicle is in use. It would therefore be desirable to provide a variable width vehicle with laterally extensible wheel assemblies secured against excessive lateral play during operation.

Prior art agricultural machines sometimes have leg weldments secured to a metal shaft. The shaft is provided in a sleeve and coupled to a hydraulic actuator. To keep the hydraulic actuator from getting damaged as forces act upon the wheels, and to reduce play in the shaft/hydraulic actuator connection, the shaft is pinched against the sleeve with bolts. The bolts are preferably tight enough to buffer impact between the wheel and the hydraulic actuator, but not so tight as to prevent the hydraulic actuator from extending and retracting the shaft relative to the sleeve. One drawback associated with such systems is that they still allow undesirable play between the shaft and sleeve. Another drawback associated with such systems is the requirement of a large enough linear actuator to overcome the pinching force of the bolts. Yet another drawback with such systems is that as wear occurs on the bearing plates, the bolts must be periodically manually tightened to prevent undesired movement of the shaft within the sleeve. It would be desirable to provide a system that reduced undesirable play between the shaft and sleeve, and eliminated the need for repeated manual tightening of bolts, while allowing the use of a smaller linear actuator.

Another drawback associated with such prior art devices is the inability to steer the wheel assemblies. While it is known to drive such wheel assemblies, U.S. Pat. No. 2,901,050 does not teach any way to steer the wheel assemblies. It would therefore be desirable to provide a variable width vehicle with laterally extensible and steerable wheel assemblies.

Yet another drawback associated with such prior art devices is the inability to use such systems in high speed vehicle applications. While the use of small universal joints and worm gears may be satisfactory for driving crane carriers at low speeds, they are not sufficient to reliably drive vehicles at high speeds for long periods of time. It would therefore be desirable to provide a variable width vehicle with laterally extensible and capable of continuous high speed travel.

The difficulties discussed hereinabove are sought to be eliminated by the present invention.

SUMMARY OF THE DISCLOSED SUBJECT MATTER

The present invention includes systems and methods for varying the tread width of a vehicle. The system uses a sleeve coupled to a frame. A shaft, coupled to a wheel, is slidably provided within the sleeve and a first actuator moves the shaft back and forth within the sleeve. A second actuator is coupled to two eccentric cylinders that rotate into and out of frictional locking engagement with the shaft. When it is desired to extend the tread width of the vehicle, the first actuator extends the shaft and wheel to the desired width. The second actuator then rotates the two eccentric cylinders into frictional locking engagement with the shaft. When it is desired to retract the tread width of the vehicle, the second actuator rotates the two eccentric cylinders out of frictional locking engagement with the shaft, the first linear actuator retracts the shaft and wheel to the desired width, and the second actuator again rotates the two eccentric cylinders into frictional locking engagement with the shaft which may automatically adjust for wear on the bearing surfaces.

The features and advantages described in this summary and the following detailed description are not all-inclusive. Many additional features and advantages may be apparent to one of ordinary skill in the art in view of the drawings, specification and claims presented herein.

BRIEF DESCRIPTION OF THE DRAWINGS

The present invention will now be described, by way of example, with reference to the accompanying drawings in which:

FIG. 8 illustrates a side elevation of a lifting linkage in accordance with one embodiment in the lowered position;

FIG. 9 illustrates a side elevation of a lifting linkage in accordance with one embodiment in the raised position;

DETAILED DESCRIPTION OF THE DRAWINGS

Figure 1:
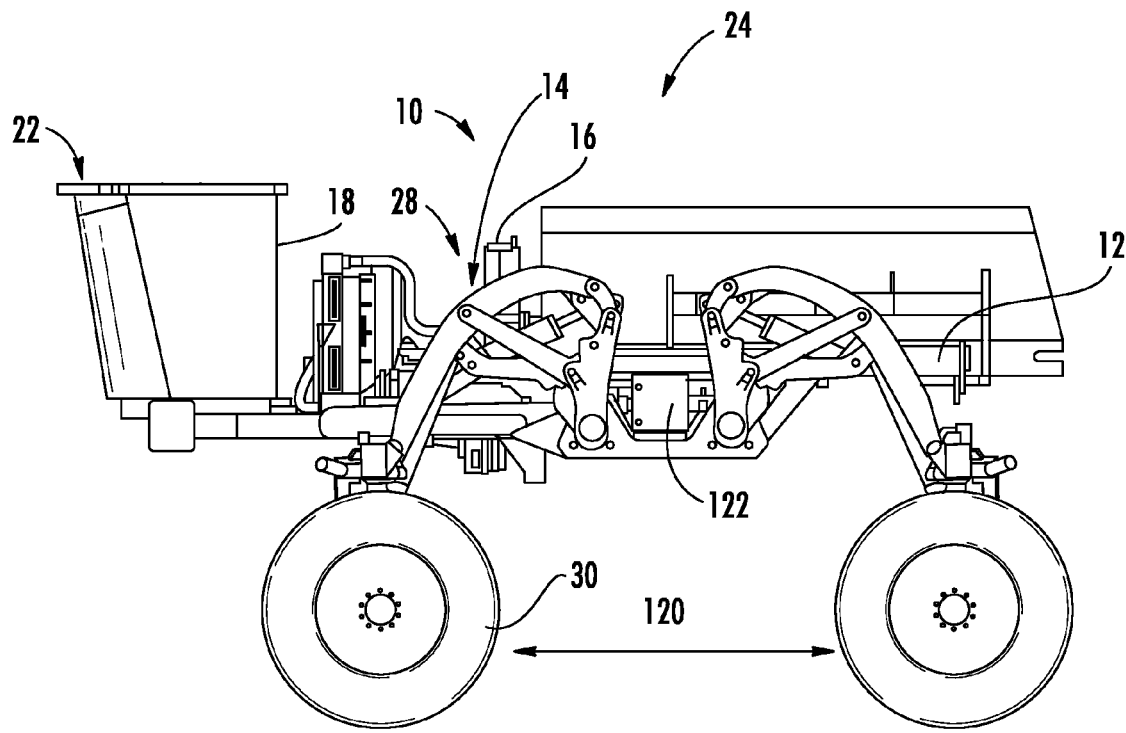
FIG. 1 illustrates a side elevation of the variable tread width vehicle shown with the vehicle in the lifted position in accordance with one embodiment.
Figure 2:
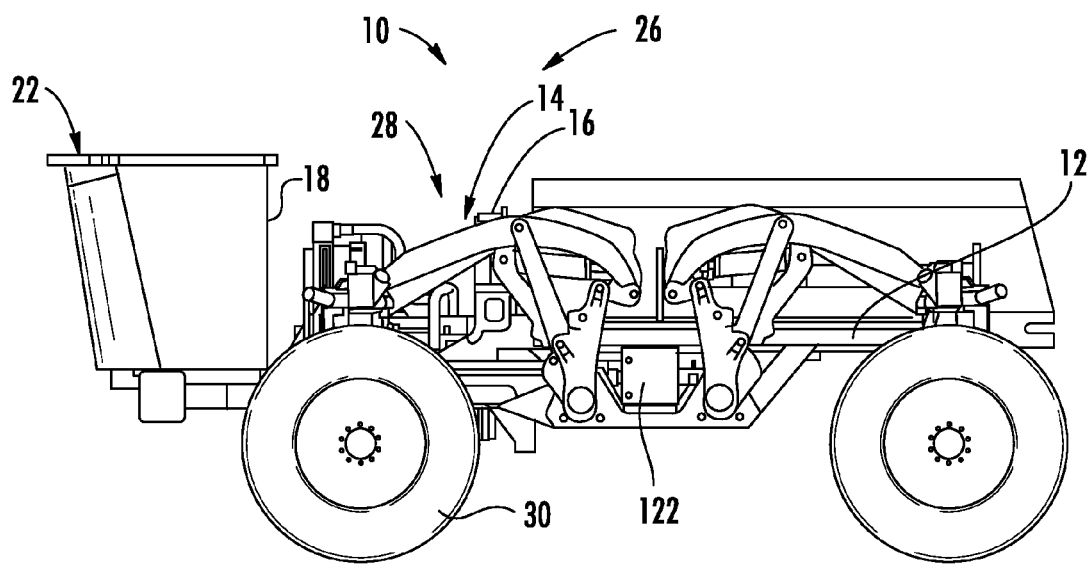
FIG. 2 illustrates the variable tread width vehicle of FIG. 1 shown with the vehicle in the lowered position.

As shown in FIG. 1, a variable height and variable tread width vehicle (10) is provided with a frame (12). Coupled to the frame (12) are an engine (14), a hydraulic pump (16), and operator station (18). A user (20) controls the vehicle (10) from a control panel (22) located on the operator station (18). From the operator station (18), the user (20) may lower the vehicle (10) from the lifted orientation (24) shown in FIG. 1 to the lowered orientation (26) shown in FIG. 2.

Variable Height

The vehicle (10) is lifted and lowered by a plurality of closed chain linkages, which are preferably four-bar linkage assemblies (28). Separate four-bar linkage assemblies (28) are provided for each wheel (30) of the vehicle. As the four-bar linkage assemblies (28) are similar except for being mirror images of one another, description will be limited to a single four-bar linkage assembly (28).

Figure 3:
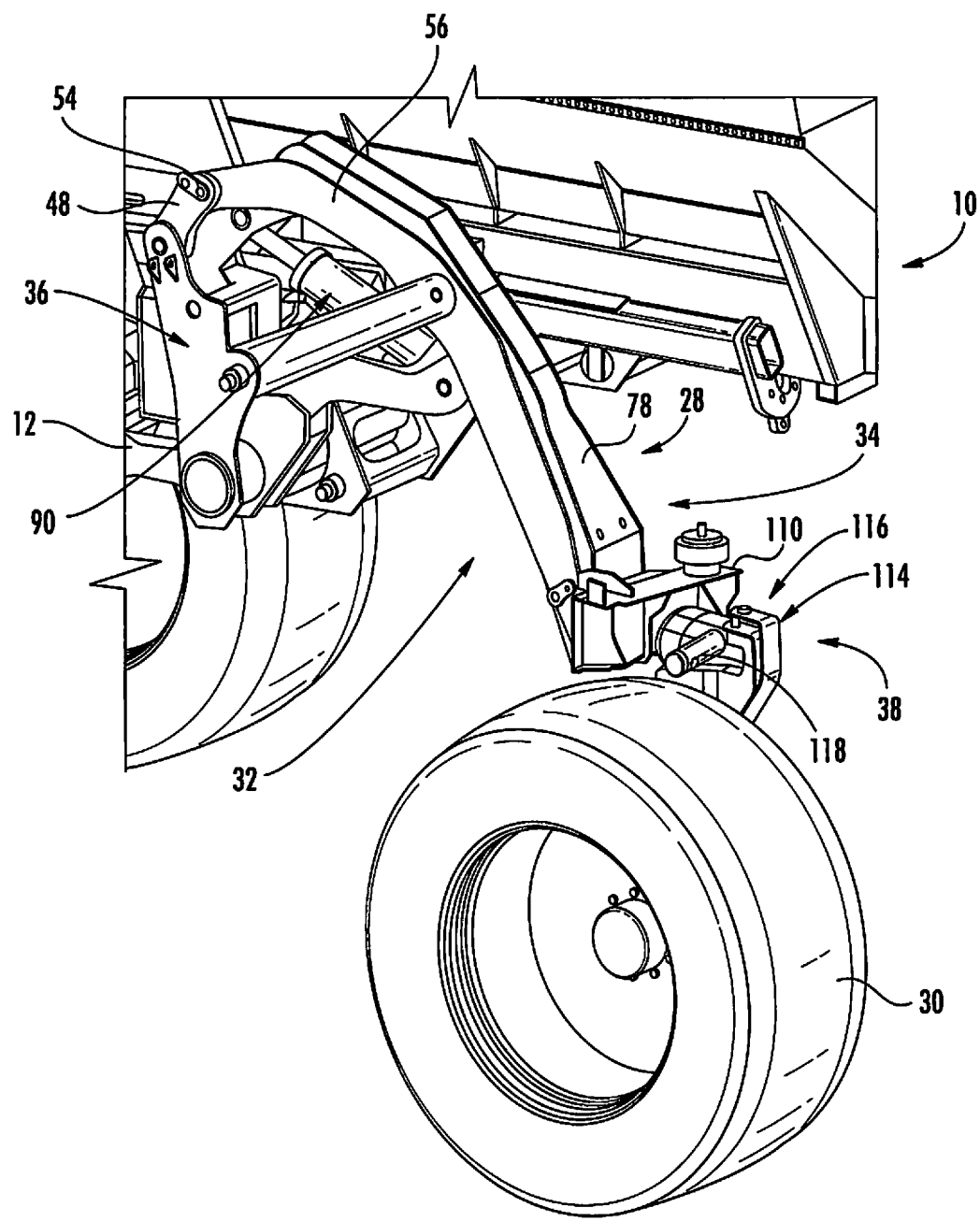
FIG. 3 illustrates a front perspective view of the height adjustment assembly in accordance with one embodiment.
Figure 4:
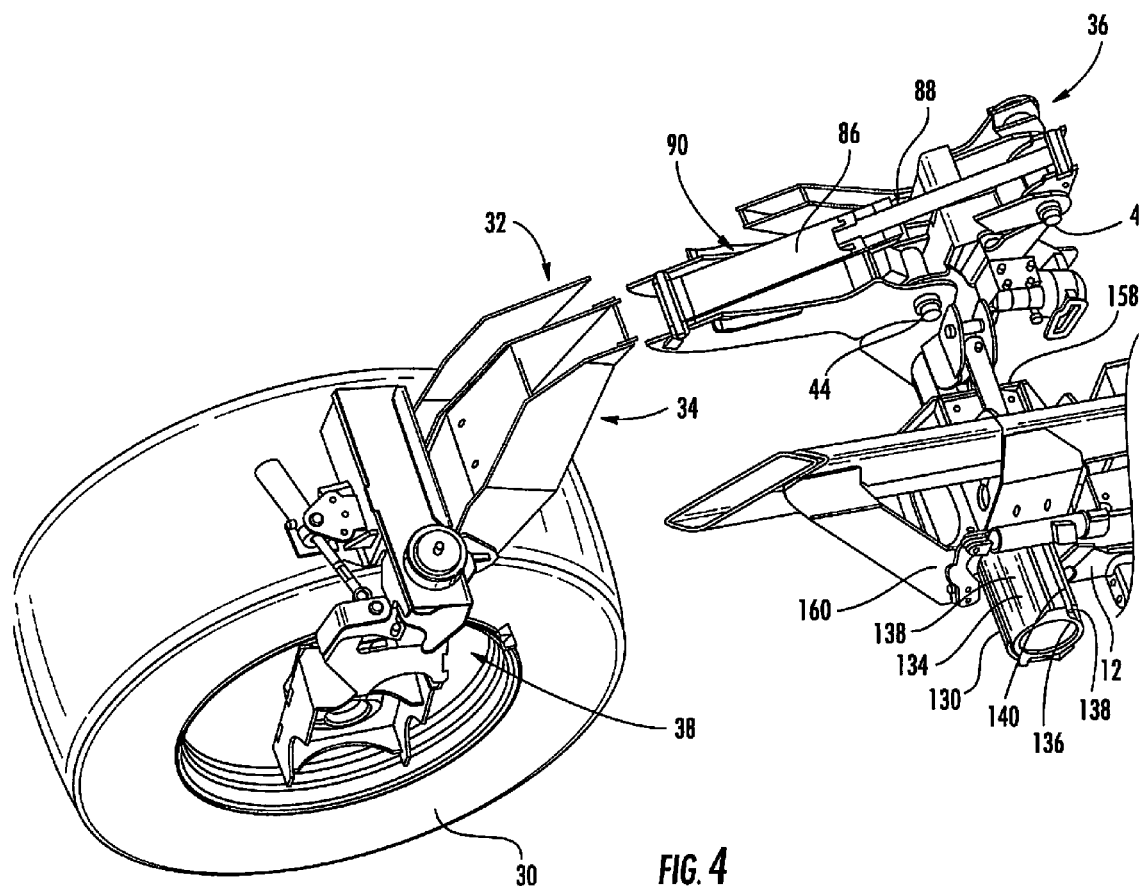
FIG. 4 illustrates a top perspective view in partial cutaway of the height adjustment assembly of FIG. 3.

As shown in FIGS. 3-4, the four-bar linkage assembly (28) includes a first linkage assembly, otherwise known as the leveling linkage (32), and a second linkage assembly, otherwise known as the lifting linkage (34). Providing the other two components of the four-bar linkage assembly are a leg support structure (36) and a leg (38). The leg support structure (36) is secured to the frame (12) and the leg (38) is coupled to the wheel (30).

Figures 5, 6:
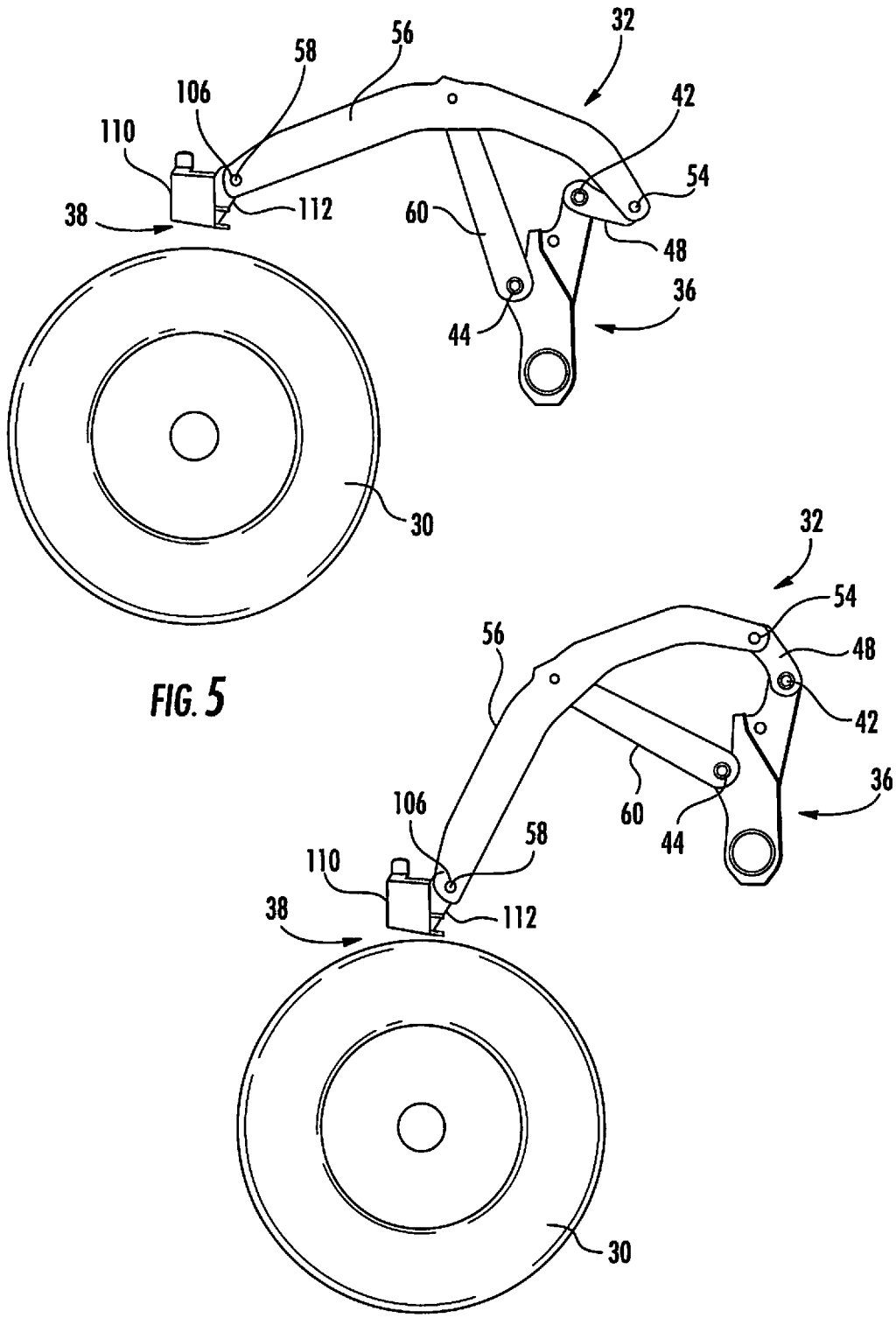
FIG. 5 illustrates a side elevation of a leveling linkage in accordance with one embodiment in the lowered position.
FIG. 6 illustrates a side elevation of a leveling linkage in accordance with one embodiment in the raised position.
Figure 7:
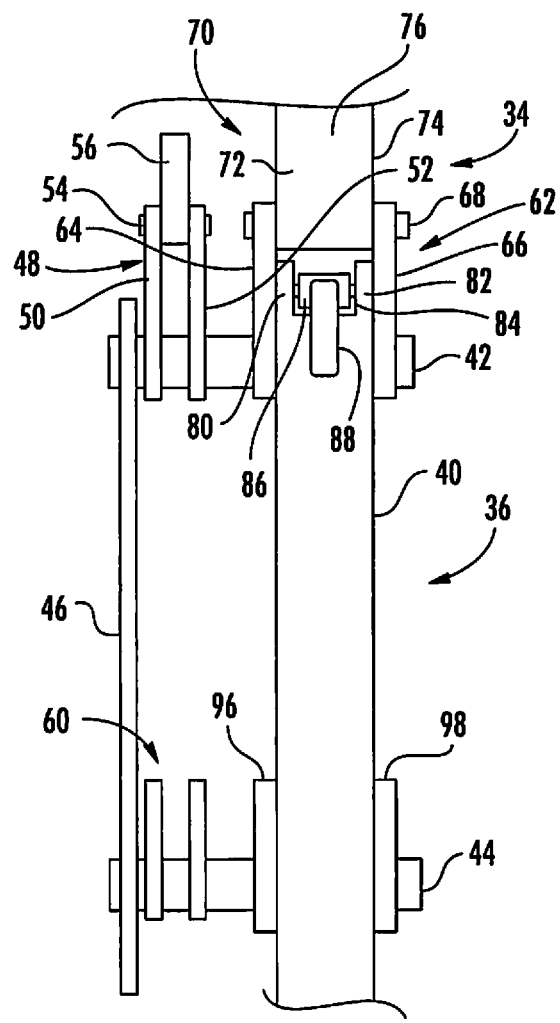
FIG. 7 illustrates a front elevation of the rear of a height adjustment assembly in accordance with one embodiment.
Figure 10:
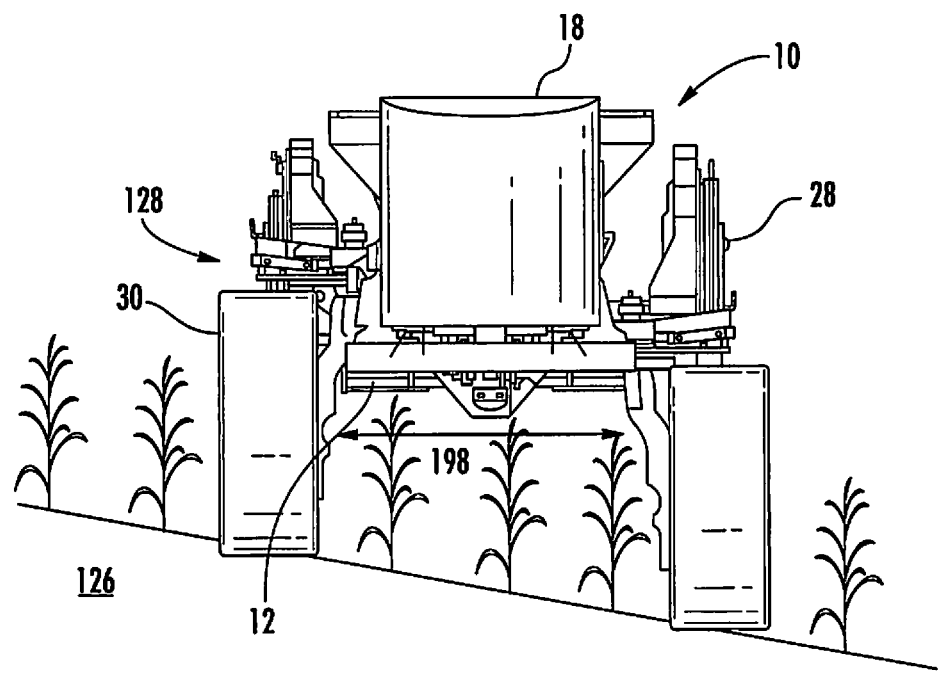
FIG. 10 illustrates a front elevation of a variable tread width vehicle moving over sloped terrain in accordance with one embodiment.

The leveling linkage (32) maintains the orientation of the leg (38) and wheel (30) as the vehicle (10) is raised and lowered by the lifting linkage (34). (FIGS. 1 and 5-6). The leveling linkage (32) also maintains the wheelbase and turning radius of the vehicle consistent as the vehicle (10) is raised and lowered. The leveling linkage (32) is pivotably coupled to the leg support structure (36). As shown in FIG. 7, the leg support structure (36) includes a main brace (40) secured to the frame (12). (FIGS. 1, 3, 4, and 7). Coupled to the main brace (40) by a pair of pins (42 and 44) is an outer plate (46). Pivotably secured to the upper pin (42) between the main brace (40) and the outer plate (46) is a first linkage (48) including a first plate (50) and second plate (52). The first linkage (48) is coupled, in turn, by a pin (54) to a second linkage (56) as shown in FIGS. 5-6, the second linkage (56) is a long curved steel plate provided with a hole (58) so that the second linkage (56) may be connected to the leg (38) via the steering knuckle (110). The second linkage (56) is pinned to the steering knuckle (110) and the steering knuckle (110) is secured to the leg (38). As shown in FIGS. 5-10, a third linkage (60) is pivotably coupled to the pin (44) between the main brace (40) and outer plate (46). The third linkage (60) is pivotably coupled on its opposite end to the second linkage (56) at a point between the first linkage (48) and the leg (38).

The lifting linkage (34) includes a fourth linkage (62) having a first plate (64) and second plate (66) pivotably secured to the pin (42) on opposite sides of the main brace (40). (FIGS. 3-5, and 7-10). The fourth linkage (62) is coupled in turn, by a pin (68) to a fifth linkage (70). The fifth linkage (70) may be of any desired design. In the preferred embodiment, the fifth linkage (70) has a pair of side plates (72 and 74) welded to a bottom plate (76) and a top plate (78). The fifth linkage (70) preferably tapers in width from the leg (38) toward the fourth linkage (62).

As shown in FIG. 7, the main brace (40) is provided with a pair of ears (80 and 82) to hold a pin (84). Provided around the pin (84) is a sleeve (86) coupled to a piston rod (88) of a linear actuator such as a hydraulic cylinder (90). (FIGS. 7-9). The cylinder barrel (92) of the hydraulic cylinder (90) is pivotably secured to a sixth linkage the sixth linkage (94) is a pair of plates (96 and 98) coupled around the pin (44) on either side of the main brace (40). The sixth linkage (94) is coupled on its other end to either side of the fifth linkage (70) via a pin (100) located between the ends of the fifth linkage (70). Unlike the third linkage (60), which is straight, the sixth linkage (94) is preferably provided with a curve (102) to allow for a longer hydraulic cylinder (90) to be located between the leg support structure (36) and sixth linkage (94). The hydraulic cylinder (90) is coupled to the hydraulic pumps (16) by means known in the art.

The four-bar linkage assembly (28) is coupled to the leg (38) by two pins (104 and 106) FIGS. 5-9. The first pin (104) is secured between two steel ears (108) welded to a steering knuckle (110). The pin (104) passes through the fifth linkage (70) that is provided between the ears (108). The other pin (106) is secured to another ear (112) welded to the steering knuckle (110). The second linkage (56) is secured to the steering knuckle (110) at a higher point than the fifth linkage (70) to allow the second linkage (56) and fifth linkage (70) to act as parallel linkages to raise and lower the vehicle (10) without increasing the wheelbase (FIGS. 3-9). The leg (38) includes the steering knuckle (110) the depending shaft/sleeve assembly (114) pivotably coupled thereto and the steering assembly (116) that includes a hydraulic cylinder (118) to pivot the shaft within the sleeve to turn the wheel (30) coupled to the shaft. The hydraulic cylinder (118) is coupled to the hydraulic pump (16) in a manner such as that known in the art.

By providing the steering assembly (116) between the suspension and the wheel, complicated prior art steering system linkage assemblies can be eliminated. Additionally, by providing the steering assembly (116) below the suspension, steering tolerances are tighter making the vehicle (10) easier to manage and allowing auto-steer systems to function more efficiently. Using the four-bar linkage described above allows a smaller hydraulic cylinder to lift the vehicle (10) a greater distance. In the preferred embodiment, the hydraulic cylinder is preferably a 61-centimeter hydraulic cylinder, which lifts the vehicle (10) 122 centimeters. Alternatively, any desired length of cylinders may be used from below 10 centimeters to in excess of 2 meters in length, depending on the application. Similarly, while in the preferred embodiment, the length of the cylinder to the lift height of the vehicle is 1 to 2, the angles and connection points of the four-bar linkage (28) may be modified to create a lift ratio anywhere from above 1 to 1, to 1 to 3 or more. The four-bar linkage assembly of the present invention also allows for four wheel independent suspension and a large under vehicle clearance that eliminates axles spanning the complete width of the vehicle. While the linkages of the four-bar linkage (28) in the preferred embodiment are steel, they may be constructed of any desired dimensions or material.

When it is desired to operate the vehicle (10) of the preferred embodiment, the user (20) manipulates the control panel (22) to direct hydraulic fluid from the hydraulic pump (16) to the hydraulic cylinders (90). The hydraulic cylinders (90) push the ends of the sixth linkages (94) away from the main braces (40), causing the fourth linkages to rotate around the main braces (40). This pushes the fourth linkages (62) downward in a straight line, thereby raising the vehicle (10) without changing the length of the wheelbase of the vehicle (10). When it is desired to lower the vehicle (10), the user (20) manipulates the control panel (22) to return hydraulic fluid from the hydraulic cylinders (90), thereby contracting the hydraulic cylinders (90), drawing the ends of the sixth linkages (94) toward the main brace (40) and rotating the fourth linkages (62) in the opposite direction. This draws the fifth linkages (70) upward, lowering the vehicle (10) without changing the length of the wheelbase (120).

As shown in FIG. 1, the vehicle (10) may also be provided with an electronic control unit (122) such as those known in the art. The electronic control unit (122) may be coupled to various other systems such as global positioning satellites, gyroscopic, or laser systems to monitor the ground (124). The ECU (122) may be programmed to maintain the vehicle (10) level even when the vehicle (10) is moving across uneven terrain (126) in a manner such as that shown in FIG. 10. As shown, either the user (20) or the Electronic Control Unit (122) may extend the four-bar linkage assemblies (28) on one side of the vehicle (10) and retract the four-bar linkage assemblies (28) on the opposite side of the vehicle (10) to allow the vehicle (10) to move along a slope while maintaining the vehicle (10) level. This type of maneuver is especially advantageous for vehicles carrying a large shifting weight and/or vehicles with a high center of gravity.

Variable Tread Width

Each lifting/leveling assembly is referred to generally as a leg weldment (128). (FIG. 4). The leg weldments (128) are bolted or otherwise secured to an extensible steel shaft (130), to allow the user (20) to vary the tread width (132) of the vehicle (10). The steel shaft (130) is preferably between 1-2 meters long and most preferably 1.5 meters long, preferably between 15-35 centimeters in diameter and most preferably 25 centimeters in diameter, and between 12-26 millimeters thick and most preferably 19 millimeters thick. While the steel shaft (130) is shown as a hollow metal shaft, the shaft (130) may be constructed of any suitable material of any desired length or thickness and may be constructed as a solid bar. Welded to the top of the shaft (130) is a first angled bar (134) and a second angled bar (136). The angled bars (134) and (136) create flat surfaces (138) and (140) that serve as bearing contact surfaces.

Welded or otherwise secured to the shaft (130) are a pair of ears (142) and (144). Secured between the ears (142) and (144) is a pin (146). The pin (146) is journaled within a sleeve (148) welded or otherwise secured to a piston rod (150) of a linear actuator, such as a hydraulic cylinder (152). The cylinder barrel (154) of the hydraulic cylinder (152) in turn is pivotably coupled to the frame (12) of the vehicle (10) in a manner such as that known in the art. The hydraulic cylinder (152) is coupled to the hydraulic pump (16) and control panel (22) to allow the user (20) to extend and retract the hydraulic cylinder (152) thereby extending and retracting the shaft (130) and leg weldment (128) relative to the frame (12). (FIGS. 1, 4 and 11).

Figure 11:
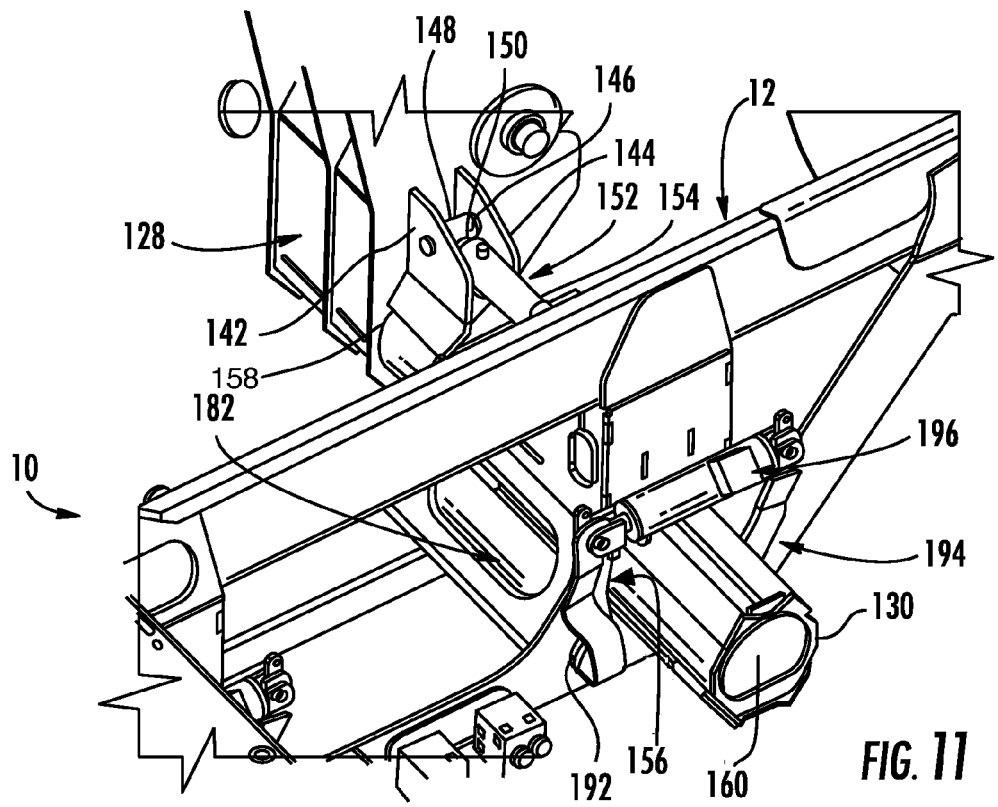
FIG. 11 illustrates a top perspective view of a tread width assembly in accordance with one embodiment.
Figure 12:
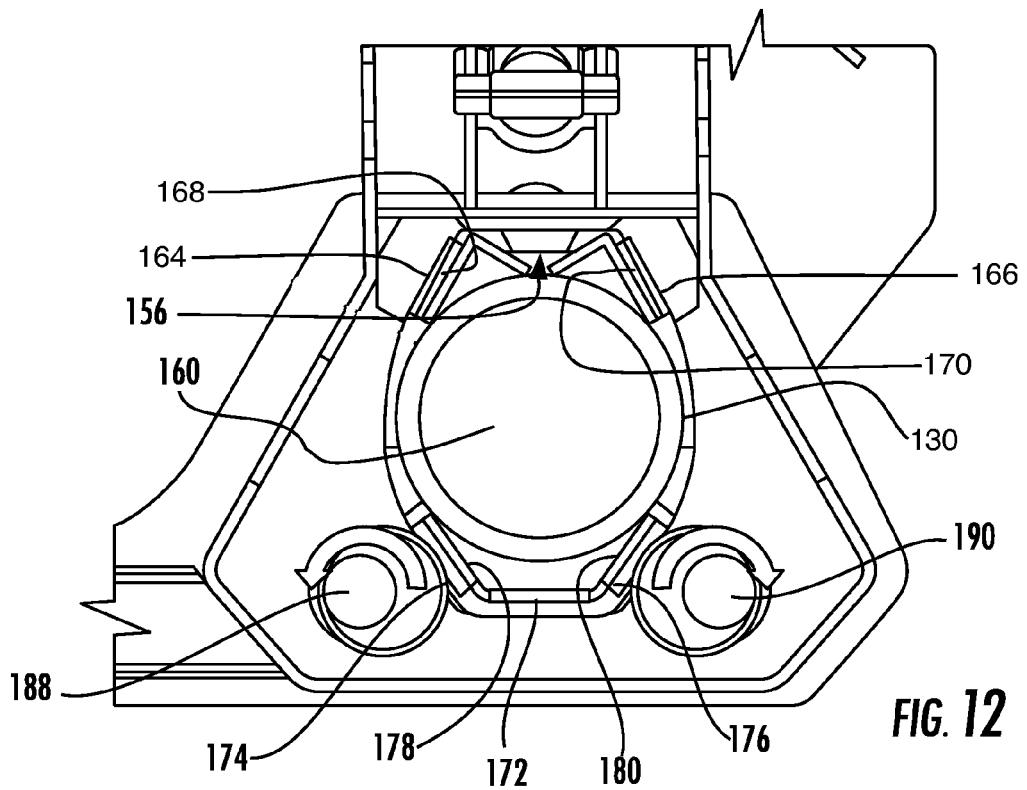
FIG. 12 illustrates a side elevation of the tread width assembly of FIG. 11, shown with the shaft, locking arms, hydraulic cylinder, carriage, and lower bearing plates removed.
Figure 13:
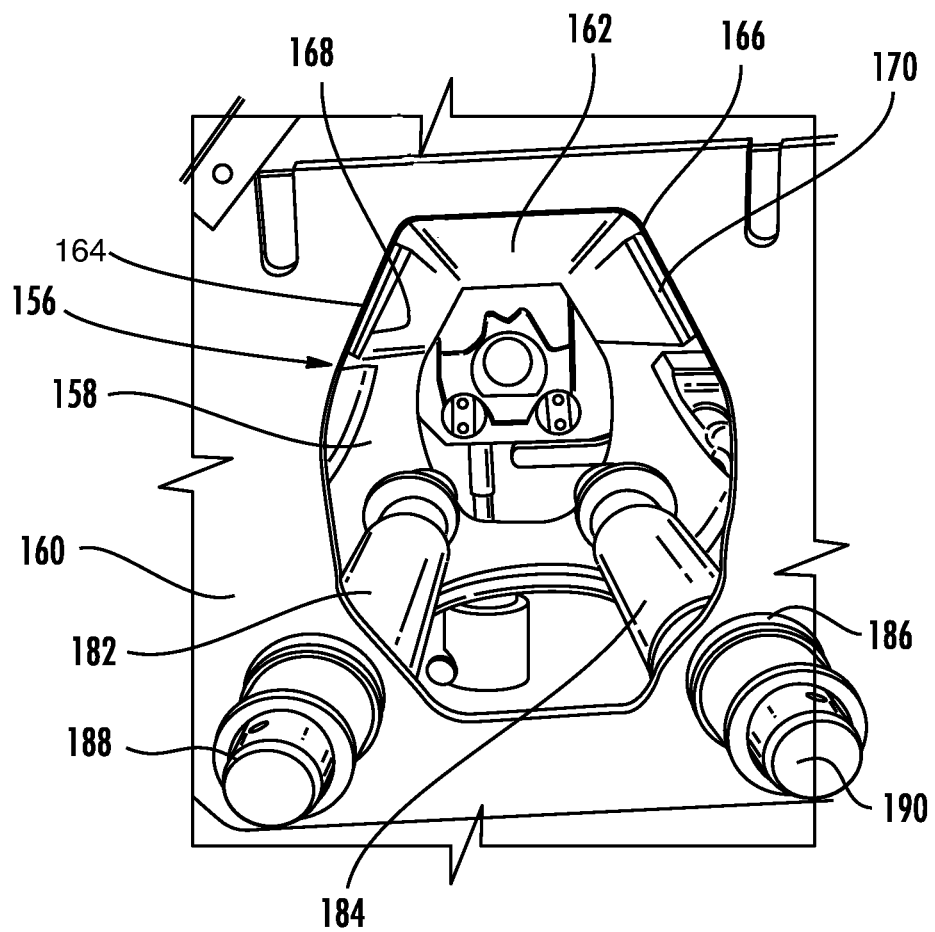
FIG. 13 illustrates a side perspective view of a sleeve of the tread width assembly in accordance with one embodiment.

As shown in FIGS. 11-12, the frame (12) defines an opening or sleeve (156) into which the shaft (130) fits. The sleeve (156) is preferably slightly larger than the exterior dimensions of the shaft (130) to allow the shaft (130) to move relative to the sleeve (156). The shaft (130) is defined by a first steel endplate (158) and a second steel endplate (160). As shown in FIG. 13, the sleeve (156) is provided with a steel plate (162) welded to and extending the entire length of the sleeve (156) between the first endplate (158) and second endplate (160). Also secured between the endplates (158) and (160) are a first steel bearing support plate (164) and a second steel bearing support plate (166). Secured to the bearing support plates (164) and (166) are bearings (168) and (170) constructed of an abrasion resistant low friction material such as bronze or any other bearing material known in the art.

Welded or otherwise secured to the bottom of the shaft (130) is a steel carriage (172). The carriage is (172) is preferably provided with two flat sides (174 and 176) which are secured to bearing plates (178) and (180). The bearing plates (178) and (180) are constructed of bronze or other bearing material that is preferably low friction and abrasion resistant. (FIGS. 12-13). Provided on either side of the bottom of the sleeve (156) are cylindrical eccentric steel bars, hereinafter referred to as (182) and (184). The ends of the eccentrics (182) and (184) are provided with offset cylindrical drive shafts (188) and (190) that are journaled into slots (186) in the first endplate (158) and second endplate (160). The eccentrics (182) and (184) are preferably constructed of hardened steel or similar strong, abrasion resistant material. While the eccentrics (182) and (184) may be of any suitable dimensions, preferably the eccentrics (182) and (184) are of a construction where rotation of the eccentrics (182) and (184) within the slots (186) alternately causes a portion of the eccentrics (182) and (184) to press against the bearing plates (178) and (180) pinching the shaft (130) against the bearings (168) and (170). When the eccentrics (182) and (184) are rotated in the opposite direction, the eccentrics (182) and (184) release pressure on the bearing plates (178) and (180) allow the shaft (130) to again move freely within the sleeve (156).

As shown in FIG. 13, the eccentrics (182) and (184) are preferably about 38 centimeters long but may be between 26-50 centimeters long. The longer the eccentrics (182) and (184) are, the greater the surface area available to press against the bearing plates (178) and (180) and the more resistant the shaft (130) is to movement within the sleeve (156). Preferably the eccentrics (182) and (184) are provided with a round cross section of 11.5 centimeters but may be provided with a diameter between 7-16 centimeters. The drive shafts (188) and (190) are provided with a diameter of 5.7 centimeters but may be provided with a diameter between 2.4-9 centimeters. The drive shafts (188) and (190) are preferably welded to, or integrally formed with, the eccentrics (182) and (184). The offset of the drive shafts (188) and (190) relative to the eccentrics (182) and (184) may be configured as desired to increase or decrease the mechanical force applied against the shaft (130) within the sleeve (156). In the preferred embodiment the axis of the driveshaft (188) is preferably positioned between 38-50% of the distance, but most preferably 44% of the distance from the axis of the eccentric (182) to the perimeter of the eccentric (182). Alternatively, the drive shafts (188) and (190) may be coaxially aligned with eccentrics (182) and (184) having an oblong or irregular cross-section.

Bolted or otherwise secured to the drive shafts (188) and (190) are a pair of locking arms (192) and (194) bolted on one end to the drive shafts (188) and (190) and on the other end to opposite ends of a hydraulic cylinder (196). The length and configuration of the locking arms (192) and (194) and the specifications of the hydraulic cylinder (196) may be adjusted to provide the desired torque to the eccentrics (182) and (184) and friction to the shaft (130) within the sleeve (156). The hydraulic cylinder (196) is coupled to the hydraulic pump (16) and control panel (22) allowing the user (20) to lock and unlock the shaft (130) from the sleeve (156) by retracting and extending the hydraulic cylinder (196).

Figure 14:
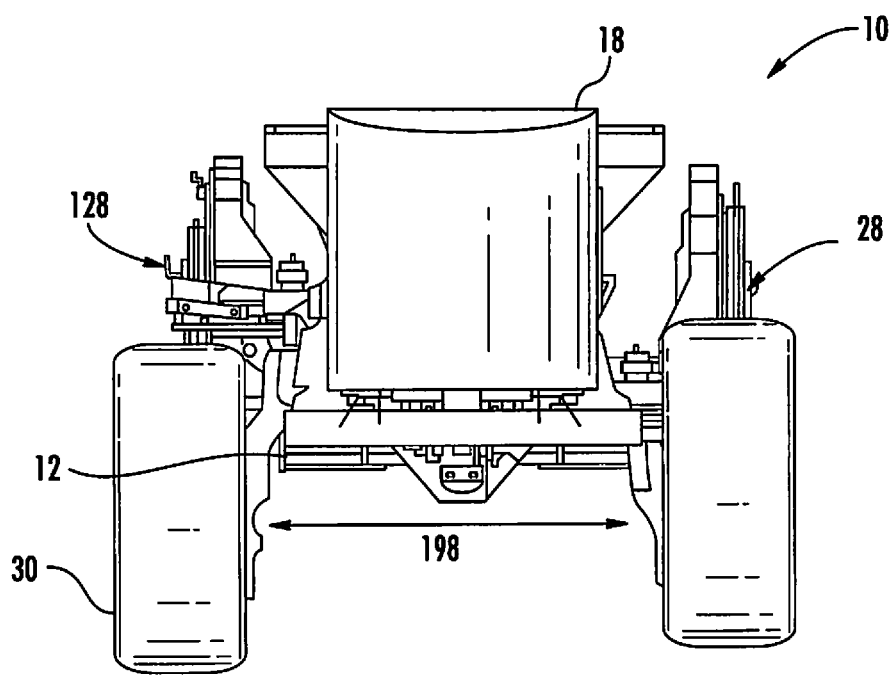
FIG. 14 illustrates a front elevation of a variable tread width vehicle shown with both wheels in a retracted orientation in accordance with one embodiment.
Figure 15:
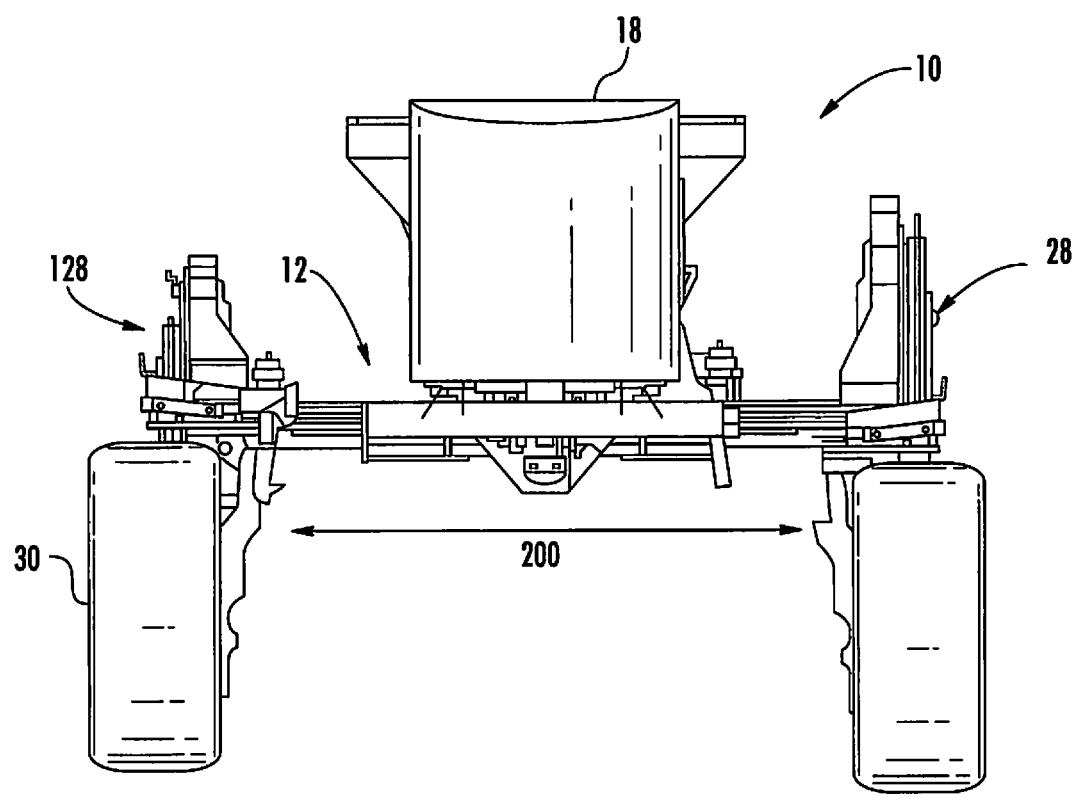
FIG. 15 illustrates a front elevation of a the variable tread width vehicle of FIG. 14, shown with both wheels in an extended orientation.

When it is desired to operate the vehicle (10) with a narrow tread width (198) as shown in FIG. 14, the user (20) retracts the hydraulic cylinder (152), thereby drawing the shaft (130)

into the sleeve (156). Thereafter, the user (20) uses the control panel (22) to actuate the hydraulic cylinder (196) to move the locking arms (192) and (194) away from one another and rotate the eccentrics (182) and (184) against the bearing plates (178) and (180) to wedge the steel shaft (130) against the bearings (168) and (170) within the sleeve (156). The vehicle (10) is thereafter drivable in the orientation shown in FIG. 14.

Figure 16:
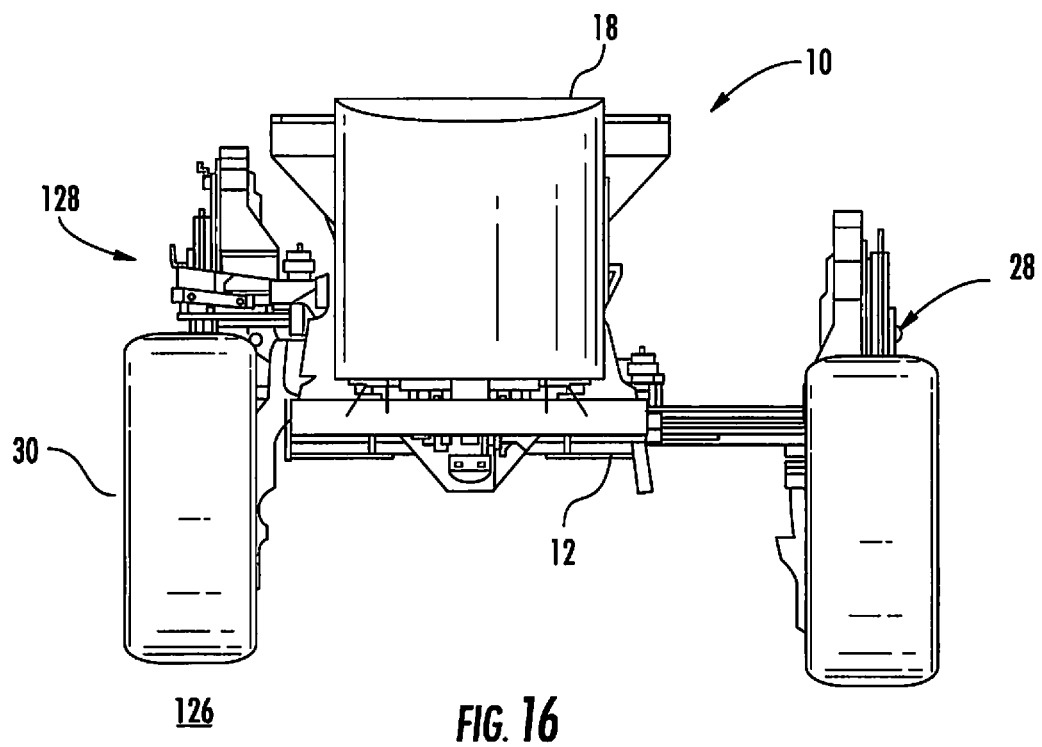
FIG. 16 illustrates a front elevation of a the variable tread width vehicle of FIG. 14, shown with one wheel in a retracted orientation and one wheel in an extended orientation.

When it is desired to operate the vehicle (10) with a wide tread width (200) the user (20) uses the control panel (22) to retract the hydraulic cylinder (196), thereby releasing the pressure of the eccentrics (182) and (184) against the shaft (130), and freeing the shaft (130) to move within the sleeve (156). The user (20) then uses the control panel (22) to extend the hydraulic cylinder (152) to move the steel shaft (130) relative to the sleeve (156). This moves the leg weldment (28) away from the frame (12), thereby increasing the tread width (132). Once the desired tread width (132) has been obtained, the user (20) uses the control panel (22) to extend the hydraulic cylinder (196), thereby rotating the eccentrics (182) and (184) and pinching the shaft (130) against movement relative to the sleeve (156). The user (20) may lock other leg weldments in place in a similar manner. If desired, as shown in FIG. 16, the user (20) may extend the wheels of the vehicle (10) on one side and not the other. The user (20) may also, or alternatively, retract a front wheel and not a rear wheel. To reduce strain on the component parts, it is desirable to only extend and retract the wheels when the vehicle (10) is in motion.

Although the invention has been described with respect to a preferred embodiment thereof, it is to be understood that it is not to be so limited since changes and modifications can be made therein which are in within the full, intended scope of this invention as defined by the appended claims.

What is claimed is:

1. A vehicle comprising:
   (a) a frame;
   (b) a wheel;
   (c) a sleeve coupled to the frame;
   (d) a shaft coupled to the wheel, wherein the shaft is provided at least partially within the sleeve and configured for telescopic lateral movement relative to the sleeve;
   (e) a first actuator coupled to the shaft;
   (f) an eccentric engaged to the shaft, wherein the eccentric is pivotable between a first position locking the shaft in place against lateral movement relative to the sleeve and a second position unlocking the shaft against lateral movement relative to the sleeve; and
   (g) a second actuator coupled to the eccentric, wherein the second actuator is powered.

2. The vehicle of claim 1, further comprising a supplemental eccentric engaged to the shaft.

3. The vehicle of claim 2, wherein the supplemental eccentric is pivotable between a first position locking the shaft in place relative to the supplemental eccentric and a second position unlocking the shaft relative to the supplemental eccentric.

4. The vehicle of claim 1, wherein the wheel has a diameter of at least one and one-half meters, and a width no greater than one meter.

5. The vehicle of claim 1, wherein the vehicle is a high clearance vehicle, having a ground clearance higher than a center of the wheel.

6. The vehicle of claim 1, further comprising:
   (a) a supplemental wheel;
   (b) a supplemental sleeve coupled to the frame;
   (c) a supplemental shaft coupled to the supplemental wheel, wherein the supplemental shaft is provided at least partially within the supplemental sleeve;
   (d) a supplemental first actuator coupled to the supplemental shaft;
   (e) a supplemental eccentric engaged to the supplemental shaft; and
   (f) a supplemental second actuator coupled to the supplemental eccentric.

7. The vehicle of claim 6, wherein the wheel is located coaxially with the supplemental wheel.

8. The vehicle of claim 7, wherein the shaft is independently extensible relative to the supplemental shaft.

9. The vehicle of claim 6, wherein the vehicle is a high clearance vehicle, having a ground clearance higher than a center of the wheel.

10. A vehicle comprising;
    (a) a frame;
    (b) a wheel;
    (c) a sleeve coupled to the frame;
    (d) a shaft coupled to the wheel, wherein the shaft is provided at least partially within the sleeve and configured for telescopic lateral movement relative to the sleeve;
    (e) a powered linear actuator coupled to the shaft;
    (f) an eccentric frictionally engaged to the shaft, wherein the eccentric is pivotable between a first position locking the shaft in place against lateral movement relative to the sleeve and a second position unlocking the shaft against lateral movement relative to the sleeve; and
    (g) a bearing provided between the shaft and the eccentric.

11. The vehicle of claim 10, further comprising a supplemental eccentric coupled to the shaft.

12. The vehicle of claim 11, further comprising a supplemental bearing provided between the shaft and the supplemental eccentric.

13. The vehicle of claim 12, wherein the eccentric and the supplemental eccentric are pivotable between a first position locking the shaft in place relative to the eccentric and the supplemental eccentric and a second position unlocking the shaft relative to the eccentric and the supplemental eccentric.

14. The vehicle of claim 10, wherein the eccentric is pivotable between a first position locking the shaft in place relative to the eccentric and a second position unlocking the shaft relative to the eccentric.

15. The vehicle of claim 10, wherein the wheel has a diameter of at least one and one-half meters, and a width no greater than one meter.

16. The vehicle of claim 10, further comprising a steering system provided between the wheel and the sleeve.

17. A vehicle comprising:
    (a) a frame;
    (b) a wheel;
    (c) a sleeve coupled to the frame;
    (d) a shaft coupled to the wheel, wherein the shaft is provided at least partially within the sleeve and configured for telescopic lateral movement relative to the sleeve;
    (e) a first actuator coupled to the shaft;
    (f) a first eccentric frictionally engaged to the shaft, wherein the first eccentric is pivotable between a first position locking the shaft in place against lateral movement relative to the sleeve and a second position unlocking the shaft against lateral movement relative to the sleeve;
    (g) a second eccentric frictionally engaged to the shaft; and
    (h) a second actuator coupled to the first eccentric and the second eccentric wherein the second actuator is a powered linear actuator.

18. The vehicle of claim 17, wherein the first eccentric is an eccentric cylinder having a length greater than its greatest diameter.

19. The vehicle of claim 17, further comprising:
(a) a first bearing provided at least partially above the midline of the shaft, between the shaft and the sleeve;
(b) a second bearing provided at least partially below the midline of the shaft, between the shaft and the sleeve; and
(c) a third bearing provided at least partially below the midline of the shaft, between the shaft and the sleeve.

* * * * *